Patented Jan. 23, 1951

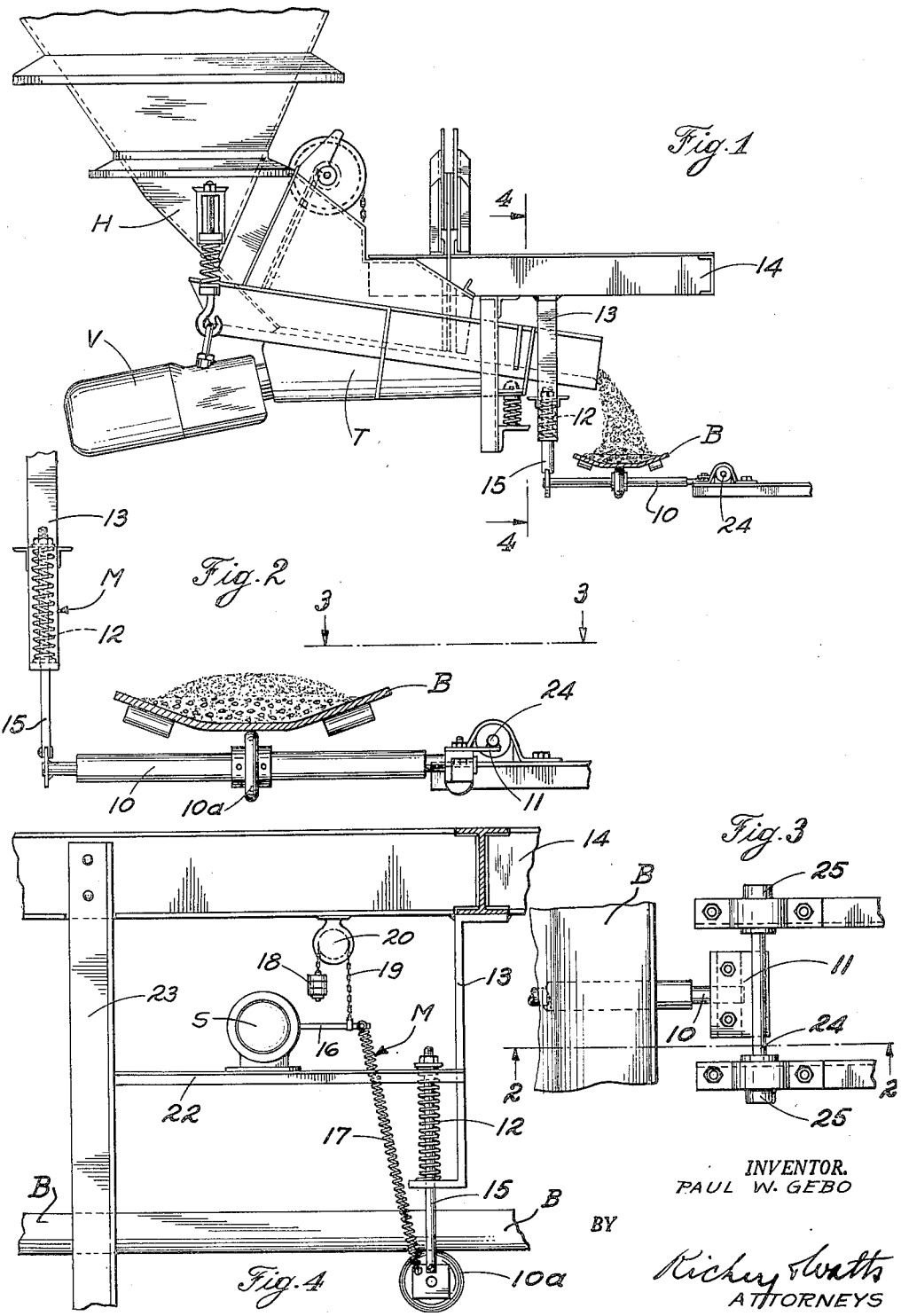

2,539,070

UNITED STATES PATENT OFFICE 2,539,070

BELT PROTECTOR FOR SINTERING MACHINES

Paul W. Gebo, Port Henry, N. Y., assignor to Republic Steel Corporation, Cleveland, Ohio, a corporation of New Jersey Application November 22, 1947, Serial No. 787,603

7 Claims. (Cl. 198—53)

1

The present invention relates generally to sintering machines and is particularly concerned with novel means for automatically controlling the handling or loading of hot sinter fines onto conveyor belts of sintering machine assemblies.

In conventional iron ore sintering operations, sintered product is discharged from pallets of a sintering machine and run over grizzly bars to separate fines from larger pieces suitable for use in a blast furnace. These fines are hot and of high mineral value, and are conveyed with a new charge of concentrates and fuel to a mixing hopper from which they are discharged onto pallets of the sintering machine to provide a porous bed which will enable efficient and effective sintering. The conveyor belts employed to carry the "hot return fines," as they are commonly referred to, toward the mixing hopper are not ordinarily resistant to heat and it is therefore customary to load the belts first with fuel and concentrates to provide a heat insulating layer between the hot fines and the belt. Nevertheless a major cause of belt failure is the burning of the belts by hot fines which is attributable to irregularities in belt loading operations. Prior efforts of others to prevent belt burning, while at the same time using the belts to carry hot fines, have failed, to the best of my knowledge.

In accordance with my invention, it is possible to overcome the foregoing difficulties of the prior art devices in an economical and fully automatic manner. Furthermore, the means of this invention is neither composed of expensive elements nor does it require careful attention and maintenance and frequent replacement of parts. When replacement of any element of the means of this invention is required it is quickly and economically accomplished without interrupting the operation of the machines.

Those skilled in the art will gain a further understanding of the present invention by referring to the drawings accompanying and forming a part of this specification, in which Figure 1 is a side elevational view partly in section of a portion of a hot fines hopper and conveyor belt equipped with one form of the present invention;

Figure 2 is a fragmentary view of the apparatus of Fig. 1, showing certain parts of the apparatus of this invention on an enlarged scale;

Figure 3 is a fragmentary plan view taken on line 3—3 of Fig. 2; and

Figure 4 is a fragmentary elevational view of the apparatus of Fig. 1 taken on line 4—4 of Fig. 1.

2

Referring to Fig. 1, the apparatus with which my invention is employed includes a hopper H, a vibrating feeder V, and a belt B to receive solids from the feeder, all of which are of the form and the construction of similar parts of the solids feeder and conveyor illustrated in U. S. Patent 2,389,566 to Parke E. Thomas, issued November 20, 1945. This apparatus is, of course, adaptable to various purposes, but it is particularly suited for use with iron ore sintering machines. In this use, hopper H is located at the discharge end of a sintering machine so that the hot return fines produced during sintering may be collected in the hopper for discharge onto vibrating feeder V and belt B. These fines together with concentrates to be sintered and fuel are carried by belt B and elevators to a pug mill usually located in the sintering plant at one end of the sintering machine, where they are thoroughly admixed and fed onto the pallets of the sintering machine.

In general, the present invention includes a switch S for controlling vibrator B, and an automatic belt weight responsive means M for controlling the switch to actuate the vibrating feeder only when ore, concentrates and fuel cover the portion of the belt B disposed to receive hot fines from the feeder. More specifically, means M comprises a pivoted, spring supported shaft 10 which carries a roller 10a engaging the under side of the central portion of belt B. Shaft 10 is secured at one end to a hinge 11 and at the other end to a compression spring 12 which urges upward movement of the shaft about hinge 11 as a pivot. Spring 12 is supported by a bracket 13 which is welded to a supporting beam 14, and bears against a flange of bracket 13 and a washer carried by a threaded rod 15 which is connected at one end to shaft 10 and extends upwardly through spring 12. Shaft 10 is operatively connected to switch S by means of a lever 16 and a tension spring 17 which is secured to the end of lever 16 and the free end or spring suspended end of shaft 10. A counterweight 18 is connected to lever 16 by means of a chain 19 carried by a pulley 20 which is fastened to beam 14. A platform comprising a plate 22 extending between bracket 13 and another bracket 23 depending from beam 14 carries switch S.

Hinge 11 comprises a rotatable shaft 24 journalled at its ends in bearings 25 and secured to member 10 by means of a plate which is welded to the shaft and is bolted to an end portion of said shaft 10.

In the operation of a sintering machine equipped with this apparatus, hot return fines are retained in hopper H while the portion of belt B passing below vibrating feeder V is not provided with a heat insulating layer of concentrates and fuel. When the portion of the belt passing below feeder V carries a heat insulating layer, the weight of the belt causes shaft 10 to move downwardly about hinge 11 and causes spring 17 to pull lever 16 downwardly contrary to the urging of counterweight 18. This movement of the lever closes switch S thereby actuating feeder V and causing flow of hot fines onto the belt. Normally, shaft 10 should be located a short distance ahead of feeder V so that the time interval required to stop flow of hot fines from the feeder to belt B corresponds to the interval required for the belt to travel from shaft 10 to a point beneath the feeder. Thus, when a heavy and protected portion of the belt carrying concentrates and fuel passes beneath the end of feeder V, hot fines flow from the feeder to the belt; and when an unprotected portion of the belt moves over shaft 10, the lifting effect of spring 12 becomes effective and belt B is moved upwardly to its unloaded position, as is shaft 10 and lever 16, and the feeder is stopped until the unprotected portion of the belt passes beyond the feeder.

This operation is fully automatic, the control over hot fines flowing from the hopper and feeder to the belt being determined by the weight of concentrates and fuel carried by the belt. Depending upon the volume of hot fines to be discharged in a given time from the feeder and hopper and the amount of heat thereby delivered onto the belt, the resistance of the belt to heat, and the insulating effectiveness of the concentrates and fuel carried by the belt, the apparatus of this invention may be adjusted to permit flow of hot fines to the belt under widely different circumstances. For instance, the compression of spring 12 may be fixed at one value for a belt which is to carry a large ratio of hot fines to concentrates and fuel and at an entirely different value when that ratio is much lower.

Those skilled in the art will appreciate that the apparatus of this invention may assume various forms without departing either from the spirit of this invention or the scope of the appended claims. Switch S, for instance, may control the operation of vibrating feeder V by either mechanical or electrical means, or by a combination of both. Also, a tension spring or equivalent device may be substituted for compression spring 12 and a tension or compression spring may be substituted for counterweight 18.

Having thus described the present invention so that those skilled in the art may be able to understand and practice the same, I state that what I desire to secure by Letters Patent is defined in what is claimed.

What is claimed is:

1. In a sintering machine assembly a movable belt for conveying material to be sintered, switch controlled means for feeding hot sinter fines onto said material on said belt, and automatic means for controlling said switch to actuate said feeding means when a predetermined amount of said material is on the part of the belt onto which said fines are to be delivered and to inactivate said feeding means when less than said amount of the material is on the said part of the belt.

2. In a sintering machine assembly, a movable belt for conveying material to be sintered, switch controlled means for feeding hot sinter fines onto said material on said belt, and belt weight responsive means for automatically controlling the switch to actuate said feeding means when a predetermined amount of said material is on the part of the belt onto which said fines are to be delivered and to inactivate said feeding means when less than said amount of the material is on the said part of the belt.

3. In a sintering machine assembly, a movable belt for conveying material to be sintered, switch controlled means for feeding hot sinter fines onto said material on said belt, and belt weight responsive means for automatically controlling the switch to actuate said feeding means only when said material is on the part of the belt onto which said fines are to be delivered, said responsive means comprising a spring suspended member engaging the belt and urging it upward, and a lever connected to the member for vertical movement therewith and operatively connected to the switch to open said switch when the member moves upward beyond a predetermined point and to close the switch when said member moves downward beyond said point.

4. In a sintering machine assembly, a movable belt for conveying material to be sintered, switch controlled means for feeding hot sinter fines onto said material on said belt, and belt weight responsive means for automatically controlling the switch to actuate said feeding means only when said material is on the part of the belt onto which said fines are to be delivered, said responsive means comprising a spring-suspended member engaging the belt and urging it upward, a lever operatively connected to the switch to open said switch when the member moves upward beyond a predetermined point and to close the switch when said member moves downward beyond said point, and means connected to the lever for constantly urging the lever upward.

5. In a sintering machine assembly, a movable belt for conveying material to be sintered, means including hoppers for continuously feeding said material onto said belt, and a switch controlled vibrating feeder to cause hot sinter fines to fall onto said material on the belt, and belt weight responsive means for controlling said switch to actuate the vibrating feeder only when said material is on the part of the belt onto which said fines are to be delivered, said responsive means comprising a spring suspended member engaging the belt and urging it upward, a vertically movable lever operatively connected to the switch to open said switch when the lever moves upward beyond a predetermined point and to close the switch when the lever moves downward beyond said point, a tension spring connected to the lever and the spring suspended member, and means connected to the lever for constantly urging the lever upward.

6. In a sintering machine assembly, a movable belt for conveying material to be sintered, switch controlled means for feeding hot sinter fines onto said material on said belt, and belt weight responsive means for automatically controlling the switch to actuate said feeding means only when said material is on the part of the belt onto which said fines are to be delivered, said responsive means comprising an idler wheel carried beneath the belt and in engagement therewith on a shaft pivotally mounted at one end for vertical movement relative to the belt, a compression spring connected to the other end of the shaft to urge the wheel and belt upwardly, and a lever connected to said other end of the shaft for vertical movement therewith and connected to the switch to open said switch when the member moves upward beyond a predetermined point and to close the switch when said member moves downward beyond said point.

7. In a sintering machine assembly, a movable belt for conveying material to be sintered, means including hoppers for continuously feeding said material onto said belt, and a switch controlled vibrating feeder to cause hot sinter fines to fall onto said material on the belt, and belt weight responsive means for controlling said switch to actuate the vibrating feeder only when said material is on the part of the belt onto which said fines are to be delivered, said responsive means comprising an idler wheel carried beneath the belt and in engagement therewith on a shaft pivotally mounted at one end for vertical movement, a compression spring connected to the other end of the shaft to urge the wheel and belt upwardly, a vertically movable lever operatively connected to the switch to open said switch and stop the vibrating feeder when the lever moves upward beyond a predetermined point and to close the switch and start the vibrating feeder when the lever moves downward beyond said point, and means including a weight and pulley combination for constantly urging the lever upward and a tension spring connected to the lever and the wheel.

PAUL W. GEBO.

REFERENCES CITED

The following references are of record in the file of this patent:

UNITED STATES PATENTS

| Number | Name | Date |
|---|---|---|
| 1,419,946 | Schaffer | June 20, 1922 |
| 1,584,909 | Van Guilder | May 18, 1926 |
| 2,015,939 | Justus | Oct. 1, 1935 |
| 2,289,186 | Flint | July 7, 1942 |
| 2,452,395 | Schelling | Oct. 26, 1948 |